Jan. 14, 1969 E. J. DI NOIA ET AL 3,421,370
RATE OF CLIMB AND DESCENT READOUT DEVICE
Filed Nov. 4, 1966 Sheet 1 of 2

INVENTORS:
Emanuel J. DiNoia
Theodore R. Breunich
BY: James R. Hoatson, Jr.
Philip T. Liggett
ATTORNEYS

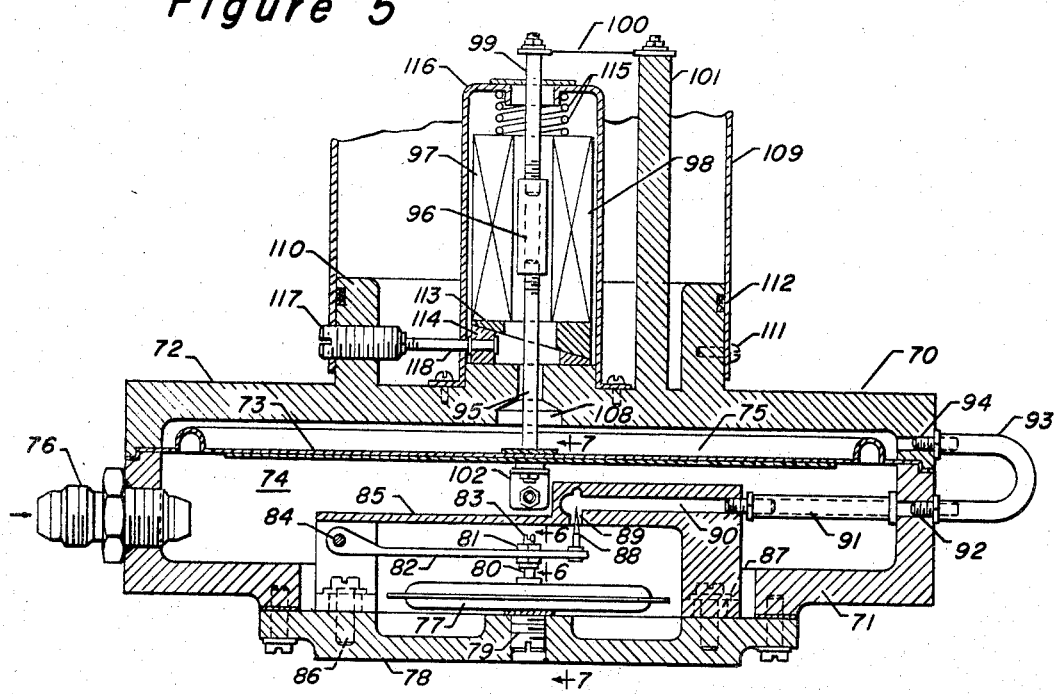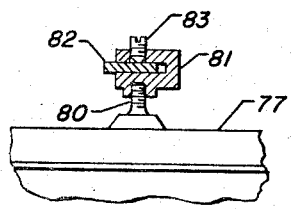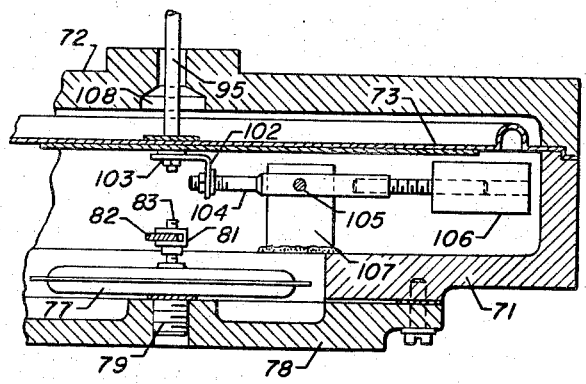

United States Patent Office 3,421,370
Patented Jan. 14, 1969

3,421,370
RATE OF CLIMB AND DESCENT
READOUT DEVICE
Emanuel J. Di Noia, Briarcliff Manor, N.Y., and Theodore R. Breunich, Stamford, Conn., assignors to Universal Oil Products Company, Des Plaines, Ill., a corporation of Delaware
Filed Nov. 4, 1966, Ser. No. 592,191
U.S. Cl. 73—179        10 Claims
Int. Cl. G01c 21/00

ABSTRACT OF THE DISCLOSURE

Rates of climb and descent can be continuously determined in an apparatus in which an altitude sensing element communicates with a rate sensing element by means of an adjustable orifice in a static air pressure inlet so that a proportioned rate of change of static pressure acts upon the rate sensing element. Indicator means, responsive to the rate sensing elements are provided.

---

Figure 1:
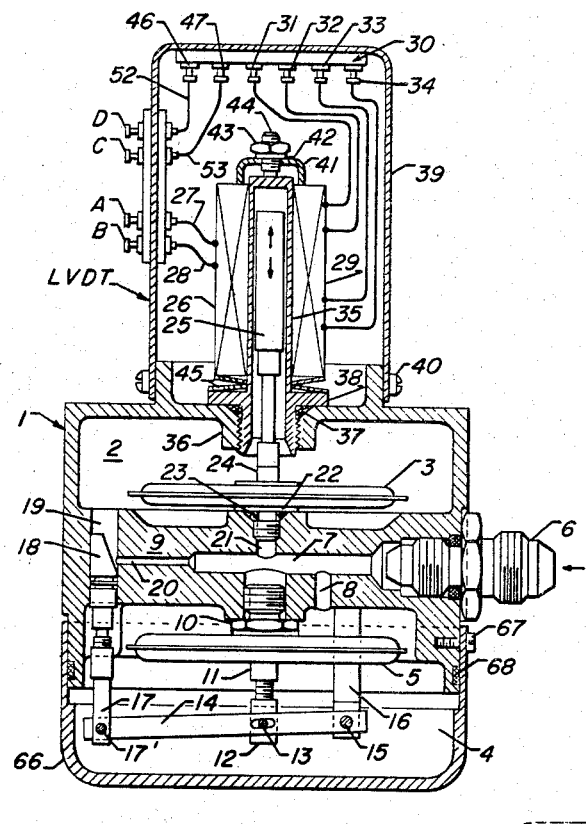

The present invention is directed to the use of pressure sensitive elements in a novel arrangement providing for an indication of rate of climb or a rate of descent. More particularly, there is provided a small compact and self-contained apparatus which incorporates two separate diaphragm or capsule elements in a manner where one is arranged to receive static pressure and provide a direct altitude reference, while the other is arranged to receive an adjusted differential pressure in a manner measuring a rate of climb and descent.

It is known that various forms and types of instruments have been designed to show change in altitude measurements at discreet rates with non-continuous signal means, or to relate altitude and speed in a switching circuit, and the like; however, it does not appear that there has been any provision of an integrated, self-contained unit which can directly indicate a rate of change of altitude in a proportioned manner, or by a continuously operating analog switching means in the manner of the preferred embodiment of this invention. The present improved device may have an indicator means or "readout" means that operates to merely trip a switch at certain predetermined rates of ascent or descent, although a preferred design and construction embodies the use of the movement of a core slug of a linearly variable differential transformer such that there will be a direct voltage readout showing continuously the rate of climb or rate of descent being experienced.

It may be considered one object of the present invention to provide a device with an altitude sensing capsule and a rate sensing element in an integrated operation, including an adjustable orifice means linked to the altitude sensing capsule, such that there is a substantially constant rate of change of pressure being exerted on the rate sensing means regardless of altitude.

It may also be considered an object of the present invention to provide in combination with the movement of the rate sensing portion of the unit an electrical analog type of operation where the movable core of a linearly variable differential transformer will in turn provide, through a demodulator circuit and movement each way from a "null" point, a direct voltage indication of a rate of climb or a rate of descent.

In a broad aspect, the present invention provides a rate of climb and descent indicating apparatus, which comprises in combination, a housing having an inlet means thereto for receiving static air pressure and an internal altitude sensing chamber directly open to said inlet means and accommodating an altitude sensing element providing a movement responsive to different altitudes, said housing, in addition, providing a separate pressure tight rate sensing chamber adapted to be in communication with one face of a movable rate sensing element, static pressure communication means from said inlet means to the face of said rate sensing element which opposes communication with said rate sensing chamber, a bleed passageway means provided between said two separate chambers and incorporating adjustable flow proportioning orifice means in such passageway, with such adjustable orifice means having a movable plug portion linked to said altitude sensing element and operating responsive to expansion and contraction movement obtained therefrom in a manner providing a non-linear change in orifice area and a non-linear static pressure flow rate through said bleed passageway to said rate sensing chamber responsive to different altitudes, and switching means connective with and operating responsive to the movement of said rate sensing element, whereby both rates of ascent and of descent are indicated.

The terms "capsule" or "diaphragm" as used herein shall not be considered to be unduly limiting since, in many cases, one type of element can be substituted for the other. Thus, the use of either of the terms may be interpreted to include suitable single leaf flexible diaphragm arrangements, double leaf capsule means and multiple leaf bellows elements, all of which are customarily used in pressure sensitive instrumentation to effect movement responsive to variations in pressure.

It should be noted that a particular feature of this invention is the use of an adjustable orifice means in a bleed passageway for a proportioned rate of change of static pressure to act on the rate sensing element. This adjustable orifice may comprise various designs which permit flow therethrough in a non-linear manner, i.e. closely follow the "curve" derived from the differential pressure for an increment of altitude change at different altitudes so as to give a constant rate of change of pressure "seen" by the rate sensing capsule. In this connection, it should be noted that for any given increment of altitude difference, there is a non-linear different pressure change at different altitude levels. For example, between 0 and 5,000 feet of altitude, there is a 68.532 inches of water pressure differential while between 70,000 and 75,000 feet of altitude there is only 3.808 inches of water pressure differential. This non-linear relationship is incorporated into the present improved device by having the altitude sensing capsule or diaphragm element link with a specially designed valving member such as a non-cylindrical piston-like member or a curved face needle valve type of means to in turn vary the area of opening through the adjustable orifice means so that there may be a properly proportioned pressure to act upon the rate sensing element.

The foregoing aspects, as well as other advantageous features incorporated in the present improved change of altitude readout device will be made more apparent upon reference to the accompanying drawing and the following description thereof.

FIGURE 1 of the drawing is a diagrammatic sectional elevation view through one embodiment of the device indicating one type of adjustable orifice means and the use of a preferred form of electrical readout operation to give a continuous indication of rate of change of altitude.

Figure 2:
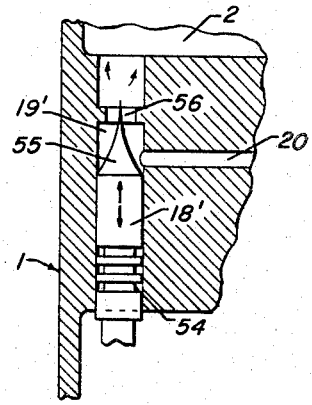

FIGURE 2 of the drawing indicates in a partial sectional view, a modified form of needle valve arrangement to effect on a non-linear proportioned static pressure flow through an orifice passageway.

Figure 3:
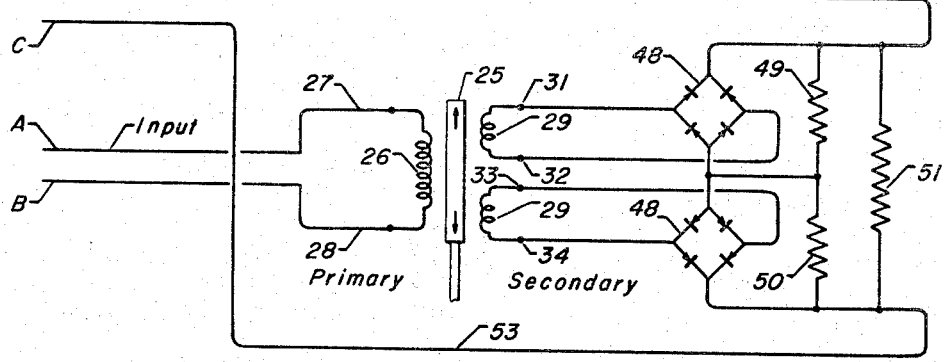

FIGURE 3 of the drawing indicates diagrammatically an electrical circuit of the linearly variable differential transformer type working through a demodulating circuit arrangement so as to provide a continuous direct reading of a rate of climb or of descent based on a voltage output.

Figure 4:
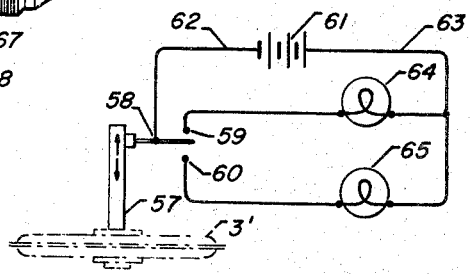

FIGURE 4 of the drawing indicates diagrammatically a simple switching arrangement to indicate a given rate of climb or rate of descent responsive to the movement of a rate sensing capsule in lieu of a continuous analog type of readout from a transformer voltage output.

FIGURE 5 of the drawing shows, in a sectional elevational view, a different embodiment of the device where the rate sensing element itself serves to separate an altitude sensing chamber and rate sensing chamber.

FIGURE 6 of the drawing shows, in an enlarged partial sectional view, an adjustable attachment of an orifice lever arm to the altitude sensing capsule.

FIGURE 7 shows diagrammatically the use of a counterweight dampening means to the rate sensing diaphragm such that gravity forces of such element may be counteracted.

Referring now particularly to FIGURE 1 of the drawing, there is shown a compact apparatus arrangement having a pressure tight housing 1 which is arranged to have an upper compartment or chamber 2 for holding a rate sensing capsule 3 and a lower chamber 4 adapted to hold an altitude sensing capsule 5. A static pressure inlet nozzle 6 is shown connective with an interior passageway means 7 and a branch passageway means 8 which are formed within a partitioning portion 9. Thus static pressure is continuously provided directly within compartment 4 to surround the altitude sensing capsule 5.

Capsule 5 at the time of assembly or at the time of adjusting and calibrating the device, is evacuated to the order of 15 microns of mercury in order to provide a substantially absolute vacuum at sea level conditions. Thus, as the unit is subjected to higher altitudes there is a decrease of external pressure on capsule 5 and an expansion thereof proportional to a particular altitude. It will be noted that capsule 5 is fixedly mounted to the lower face of partitioning means 9 by screw mounting means 10 such that all expansions result in a downward movement of shoulder means 11 and pin connector means 12. The latter has horizontal shaft means 13 extending therethrough to make a pivot connection with arm 14. The latter in turn has an end bearing or pivot connection at shaft 15 which is in a fixed position extending from or between post means 16. Such an arrangement in turn provides that the opposing end of arm member 14, at pivot connection 17' with rod means 17, will in turn effect an increased movement for the rod means 17 as compared with movement at 13. In the present embodiment there is an approximate 3 to 1 ratio in the linkage such that with a ⅛" movement at pin 13 will cause a ⅜" movement at pivot means 17'.

Rod means 17 in turn connects with a piston or plug type of valving member 18 to provide an adjustable orifice means. The plug member 18 is designed to move back and forth within a cylinder-like section 19 which provides communication between a static pressure bleed passageway 20 and chamber 2. The piston member 18 is of a special design providing a variable, non-linear, cross-sectional area for the end portion thereof to in turn be able to adjust the static pressure flow through bleed orifice 20 into chamber 2 in a non-linear manner responsive to a particular altitude for the instrument. As will be still further explained hereinafter by way of an example, the linkage means from the altitude sensing capsule 5 to the piston means 18 of the adjustable orifice arrangement will control the rate of change of static pressure applied to the external surface of rate sensing capsule 3 within chamber 2. The interior of capsule 3 communicates directly through a passageway 21 and passageway 7 to the static pressure source at inlet nozzle 7 so that as a result there is always a differential pressure being exerted upon capsule 3. Also, by having a controlled variation in the bleed flow from passageway 20 into chamber 2, by reason of valving means 18, there will be a constant rate of change of pressure exerted on the rate sensing element. Such rate of change of pressure always approximating a predetermined change of pressure in inches of water per second.

In the present embodiment it will be noted that capsule 3 has a central portion thereof fixedly attached to the internal partition 9 by means of a threaded inlet nozzle 22, and, in addition, a gasket or seal means 23 is clamped between the lower central hub portion of the capsule 3 and the threaded hub portion 36 of partition means 9. Thus, in operation, any resulting change in pressure on the rate sensing capsule 3 causes the upper central portion thereof, connecting to rod means 24, to in turn move up and down responsive to any change in rate of climb or rate of descent. Also, in the present embodiment, the connector rod means 24 is shown attached to a movable core or slug member 25 comprising part of a linearly variable differential transformer (LVDT). The latter has a primary coil section 26 with leads 27 and 28 connecting with input terminals indicated respectively as A and B; while, in addition, a secondary coil means 29 has outlet lines which connect with demodulating circuitry means 30, at 31, 32, 33 and 34.

For pressure tight construction purposes, the core member 25 is maintained within a vertically elongated shield or encasing 35 which in turn threadedly engages the top of housing 1 at bushing 36. A seal or gasket ring 37 is also shown between the flange section 38 of casing 35 and the top of housing 1 to insure a pressure tight chamber 2. Entirely encompassing the LVDT and supporting the demodulator circuit means 30 is an upper casing section 39 bolted or otherwise attached to housing 1 by screw means 40. For fine voltage adjustment purposes, the present improved design still further provides means for varying the vertical positioning the transformer coils 26 and 29 around the casing 35 and core member 25, with such adjustment means making use of spring washer means 45 and of a compression ring 41 under a lock washer 42 and an adjustable nut 43 on a threaded stem 44. Actually, the compression ring 41 adjusts the coils of the unit with respect to the core member 25 by compressing or releasing the pressure being exerted on the set of spring washers 45 placed below the transformer coils and the top of flange member 38. The actual resulting output from the core slug 25 in the LVDT unit and from the demodulating circuit at 30 is provided from terminals C and D which in turn connect with the circuit means 30 at points 46 and 47 by means of lead wires 52 and 53.

As best shown in the diagrammatic FIGURE 3 of the drawing, an alternating current voltage input at A and B provides an energizing of the primary coil 26 of the LVDT and a capsule 3 movement of the core member 25 will effect a varying voltage output from the secondary coil 29 in a linear manner. Also, as shown diagrammatically, the secondary coil outputs at 31, 32, 33 and 34 connect with full wave bridge rectifier means at 48 and the latter in turn connect with suitable resistors, such as 49, 50 and 51, to provide a desired direct voltage range leading to lines 52 and 53 which in turn provide the varying voltage output levels at C and D. As will be more fully explained hereinafter in a particular example, there may be adjustment of the LVDT unit such that there will be a given voltage change from the demodulator circuit that is either greater or less than a predetermined voltage selected for no rate of change of pressure being sensed by capsule 3. Thus, as the rate of ascent increases the LVDT output can increase until it reaches a particular voltage level for a particular rate of ascent and conversely as the rate of descent increases from the no change point, the LVDT output will be decreased to zero voltage.

In FIGURE 2 of the drawing, there is indicated a modified type of design or construction for the adjustable orifice means between the bleed passageway 20 and the chamber 2. In lieu of a non-linearly tapering for the end portion of piston member 18, as shown in FIGURE 1, there is indicated a valve plug member 18′ with a labyrinth seal means 54 for the bore or channel section 19′ and a non-linearly tapering cone or needle valve type of end section 55. The latter will vary the opening through a seat or restricted area at 56 within passageway 19′ so as to in turn vary the rate of static pressure bleed into chamber 2 responsive to the linkage means from an altitude sensing capsule. The linkage means to plug means 18′ and an altitude sensing capsule construction may be provided in a manner similar to that shown in FIGURE 1 of the drawing. The adjustment of flow from the bleed passageway is as previously noted, carried out such that there is a constant rate of change of pressure exerted upon the rate sensing capsule 3 within chamber 2 regardless of a particular altitude level. Thus, for an altitude relatively near the ground the variable orifice means has a small area for static pressure bleed flow as compared with a larger bleed area where there is a high altitude for the unit. Again, the gradual changes in orifice area, for incremental changes in altitude, are in a non-linear relationship since they will approximate a curve in turn following pressure differences for an incremental change of altitude starting at sea level and carrying on up to a predetermined high altitude.

Still other types of valving means can of course be furnished to provide the desired non-linear varying area relationship and non-linear flow from the bleed orifice into chamber 2 and the invention need not be limited to either the system shown in FIGURE 1 or to the design of FIGURE 2. Actually, sufficient accuracy may be provided in the utilization of a valving means which closely approximates a series of four or five straight lines that in turn closely follow the heretofore mentioned curve which can be provided by plotting pressure changes exerted for uniform incremental changes in altitude.

In FIGURE 4 of the drawing there is indicated, in a simple diagrammatic manner, a rate of change of altitude switching means or indicator means operative from a movable post 57 which in turn connects with a rate of change of pressure sensing capsule such as 3′. In other words, in lieu of an analog readout type of indicating means as provided by the linearly variable differential transformer arrangement of FIGURES 1 and 3, there may be a switch arm 58 operative to contact terminals or lines 59 and 60. Thus, in this system, there is a direct switch opening or closing for a predetermined desired rate of altitude change, either upwardly or downwardly. In this diagram there is indicated a battery power supply 61 connecting through line 62 with switch arm 58 and line 63 connective with the separate lamp means 64 and 65. Where a rate of descent is such as to provide the upward movement of rate sensing capsule 3′ and the arm 58 to contact point 59 there will be an indication of such rate of descent as to energize lamp means 64. Conversely, where a rate of climb is such that arm means 58 move downwardly sufficiently to contact line 60 there will be an energizing of indicator lamp 65, in turn indicating such predetermined rate of climb. At such times that there is no contact with either of the terminals or lines 59 or 60 there will be rates of climb or of descent which will be in a range less than a predetermined amount. Still other kinds of switching means and circuitry may be utilized in combination with the present improved dual capsule and adjustable orifice flow construction and be within the scope of the present invention; however, the continuous analog type of direct voltage readout calibrated to in turn show continuously an actual rate of climb or rate of descent is preferred and may be provided in a substantially compact integrated manner, as illustrated by the embodiment of FIGURE 1.

In order to still further explain the design and operation of the present rate of change of altitude apparatus, the following specific design aspects are set forth in an illustrative embodiment.

*Example*

Considering a unit, such as shown in FIGURES 1 and 3 of the drawing, there will be provided a design to operate for a determination of rate of climb or rate of descent, up to 5,000 feet per minute, at any altitude from sea level to 75,000 feet. Thus, sensitivity is determined by the pressure differential existing between 70,000 feet and 75,000 feet of altitude. The following Table I shows data indicating the change in pressure for each 5,000 foot increment of altitude up to 75,000 feet above sea level. Also, shown in the table is a third column of figures, representing a change in pressure per unit of time, i.e. inches of water per second.

TABLE I

| Altitude in feet | Total change, inches of H₂O | Inches of H₂O/sec. |
| --- | --- | --- |
| 0–500 | 68.532 | 1.1422 |
| 5,000–10,000 | 58.782 | 0.9797 |
| 10 M–15,000 | 50.237 | 0.8373 |
| 15 M–20 M | 42.677 | 0.7113 |
| 20 M–25 M | 36.019 | 0.6003 |
| 25 M–30 M | 30.188 | 0.5031 |
| 30 M–35 M | 25.108 | 0.4185 |
| 35 M–40 M | 20.450 | 0.3498 |
| 40 M–45 M | 16.101 | 0.2684 |
| 45 M–50 M | 12.663 | 0.2111 |
| 50 M–55 M | 9.956 | 0.1659 |
| 55 M–60 M | 7.830 | 0.1305 |
| 60 M–65 M | 6.157 | 0.1026 |
| 65 M–70 M | 4.842 | 0.0807 |
| 70 M–75 M | 3.808 | 0.0635 |

With regard to the second column of figures in the Table I, the pressure change for any one increment may be considered to be linear, such that between 70,000 and 75,000 feet there will be 3.808 inches of water per minute on a scale which will indicate a rate of change of altitude up to 5,000 feet per minute. In the third column of the Table I, it will be noted that the 3.808 inches of H₂O per minute is equal to 0.0635 inch of H₂O per second.

As previously described in connection with FIGURE 1, the lower altitude sensing capsule 5 is evacuated to a substantial absolute vacuum and is adjusted, or chosen of a particular size, such that there will be expansion of a given increment of distance, such as ⅛″, for an altitude change from sea level to 75,000 feet. Conversely, during descent the capsule will compress with the effect of static pressure for ⅛ of an inch as it is moved from a 75,000 foot altitude to sea level. Where the linkage connective with capsule 5 is such that arm 14 has a movement ratio of 3 to 1, then there can be a maximum movement of ⅜ of an inch on piston means 18 from the corresponding movement of pivot means 16 and rod 17. The static pressure effect from bleed orifice and passageway 20 will be substantially wide open at the 75,000 foot altitude level, and for the next 5,000 foot increment of design there will be an approximate 0.0635 inch of water per second as the rate of change of pressure "seen" externally by the rate sensing capsule 3. This represents the smallest rate of change; however, as hereinbefore noted, the design of the piston 18 or other adjustable means for the orifice from the bleed passageway will effect a non-linear relationship. Thus, at lower altitudes there is a higher proportional "choking" of the orifice whereby the rate sensing capsule will receive a substantially constant pressure bleed effect for each increment of altitude change. On the other hand, for high altitude levels, the orifice bleed opening is relatively large and effects little area change to effect a constant rate of change of pressure for the given 5,000 foot increment of altitude change.

In effecting an actual readout, the linearly variable differential transformer (LVDT) may be adjusted to vary over a 5 volt range for a particular range of maximum movement of rate sensing capsule 3, such as ⅛″. Specifically, a "null" point may be provided at a half way point on the 5 volt range such that there is a 2.5 volt output from the LVDT with no rate of change of pressure and with no rate of change of altitude. Thus, as the rate of assent increases, the LVDT voltage output will increase from 2.5 volts to a 5 volt limit for a 5,000 foot per minute indicating scale. Conversely, as the rate of descent increases until the LVDT output is decreased from the 2.5 volts null point to zero volts, then the rate of descent will be indicating 5,000 feet per minute. Stated another way, each 0.5 volt either way from the null point of 2.5 volts will show a 1000 feet per minute rate of change of altitude.

The foregoing 75,000 foot altitude limit, the 5,000 foot increments and 5.0 volt range on an indicator or readout means, are merely by way of example. Obviously other voltage ranges may be utilized and other increments of change in altitude can be used in a similar manner to provide a similarly operating analog type of readout. The actual readout may be on a calibrated volt meter type of scale or other readily visual means, including moving light bands and the like.

The particular compact construction of FIGURE 1 should also be considered diagrammatic and need not limit the scope of the present invention with respect to the housing means, or other linking means, and the like. For example, the lower portion of the housing 1 is shown as having the cover plate 66 bolted to the lower portion thereof by means of cap screw means 67 and the use of an O-ring or suitable gasket means 68 therebetween. However, the lower altitude sensing chamber 4 as provided by this cover 66 need not be pressure tight to the same extent as chamber 2 and other conventional cover or shielding means merely to protect the capsule 5 and the linkage means connecting thereto maybe sufficient for most units. Still further, it is not intended to limit the construction of the housing or other portions of the unit to any one particular type of material inasmuch as various metals or composites may be used in connection with the different components in a manner to achieve optimum operation. The low temperature conditions encountered at high altitudes are necessarily considered in the choice of certain of the components in the unit. Suitable electrical insulation means will also be required in connection with portions of the LVDT and demodulating circuitry.

Referring now particularly to the modified construction of FIGURE 5, there is shown a pressure tight housing 70 which in turn is assembled from a lower section 71 and an upper section 72. A movable or deflectible diaphragm member 73 transverses the interior of the housing, being clamped between the two sections, to provide a separate lower altitude sensing chamber 74 and an upper rate sensing chamber 75. A static pressure inlet 76 connects with the interior of the altitude sensing chamber 74, and, in this instance, with the exterior face of the altitude sensing capsule 77 which is mounted inwardly from the inside face of a section 78 which in turn comprises a lower central portion of the lower housing section 71. A threaded post or hub portion 79 is threadedly engaged with the housing portion 78 so as to provide an adjustable vertical positioning for the capsule 77 within the interior of the housing 70.

As pointed out in connection with capsule 5 for FIGURE 1, the altitude sensing element is evacuated at the time of assembly of the device so as to provide a substantially absolute vacuum at sea level conditions. Thus, as the unit becomes subjected to higher altitude conditions there is a decrease of external pressure on capsule 77 and an expansion or movement of the upper section thereof proportional to a particular altitude being sensed within chamber 74. As best shown by FIGURE 6 of the drawing, there is a short shaft section 80 connective with a yoke or U-shaped section 81 which is adapted to clamp onto an intermediate portion of a transverse lever arm member 82 by means of cap or set screw means 83. The arm member 82, as shown in FIGURE 5, is pivoted at one end thereof to a horizontal pin or shaft 84 which in turn extends between vertical portions of a supporting bracket 85. The latter is shown as being adjustably bolted to the lower housing section 78 by means of cap screws 86 extending through oversized slots 87 within lower flanged footing portions on the support bracket 85. The free end portion of arm member 82 is provided with an upwardly extending valve member 88 adapted to move within a small orifice 89, which in turn is at the inlet to a bleed passageway 90 extending through a portion of the interior support bracket 85 to a connector tube 91. The latter passes through sleeve means 92 and housing section 71 to connect with a tube section 93 which in turn discharges through a passageway 94 into the interior of the rate sensing chamber 75. Thus, there is provided adjustable flow proportioning orifice means between the separate internal chambers of the housing.

The vertically moving valve member 88 may be of the tapered plug or specially tapered needle valve type of construction similar to that indicated diagrammatically in FIGURE 2 of the drawing. Thus, by having a controlled valvation in the bleed flow through pasageway 90 and tubing means 91 and 93 into the rate sensing zone 75 there will be a constant rate of change of pressure exerted on the rate sensing diaphragm 73, with such rate of change of pressure always approximating a predetermined change of pressure in inches of water per second, such as set forth in the foregoing example. Suitable adjustment and calibration for the movement of the altitude sensing capsule 77 is accomplished in the present embodiment not only from the attachment of threaded section 79 in the lower face of capsule 77 and the threaded adjustment into yoke member 81 but, in addition, through the lateral or transverse attachment of yoke 81 onto arm member 82 by cap screw 83. Support bracket 85 can be movably adjusted by the loosening and retightening of clamping cap screws 86 to the lower housing section 78, as hereinbefore noted.

In order that the resulting movement of the rate sensing diaphragm 73 can provide a read out to show a rate of change of ascent or a rate of change of descent, there is a vertically extending rod member 95 connecting to the core or slug member 96 which comprises part of a linearly variable differential transformer (LVDT). The latter, like the embodiment of FIGURE 1, is provided with a surrounding coil section which includes a primary coil portion 97 and secondary coil portions 98. The LVDT can provide a portion of a demodulating circuit with input terminals A and B and output terminals C and D, such as set forth in connection with FIGURES 1 and 3, so that it is not deemed necessary that further explanatory detail be set forth in connection with the present embodiment of FIGURE 5.

There is, however, shown in connection with the upper portion of the slug or core member 96 a rod section 99 which connects with a flexible connector plate 100. The latter in turn is supported from the post or cast section 101 extending upwardly from the upper housing portion 72. The flexible guiding means provides a desirable system for eliminating all of the friction in the controlled support and movement of the diaghram section 73 whereby there will be accurate controlled movements of the core member 96 in coil means 97 and 98. Also, in accordance with a preferred construction of the present invention, there is a flexible or slidably movable guide and support means provided below the diaphragm member 73, as best shown in FIGURE 7 of the drawing. In other words, there is provided a bent flex plate 102 which is bolted or otherwise attached to the lower face of the diaphragm by means of clamping means 103, while the vertical portion of flex plate 102 connects with a movable arm member 104 carrying through a pivot means 105 to counterweight member 106. Pivot means 105 is extending laterally from support post 107 and extending upwardly from the interior portion of lower housing section 71. The lower flex plate 102 actually operates together with the upper flex plate 100 to provide a fully flexible guiding means for the entire movement of core member 96 responsive to pressure changes exerted against diaphragm 73. At the same time, the counterweight connection to the lower flexible member 102 provides an adjustable means to counteract the gravity force of the unit itself.

Inasmuch as the rod or shaft member 95 extending upwardly from the diaphragm 73 must pass through an open passageway means 108 in housing section 72 and communicate with the open construction of the LVDT there is provided a pressure tight removable housing 109 around the latter and connective with a peripheral wall portion 110 of housing 70 by means of a plurality of bolts or cap screw members 111. A suitable seal or gasket means 112 is also shown between the interior wall or cover 109 and the exterior face of the wall section 110 in order to provide an adequate pressure tight seal for the entire rate sensing zone of the device.

The present improved embodiment also indicates means for obtaining a very fine adjustment for locating the primary and secondary coil means of the LVDT by virtue of movable and adjustable support means 113 and 114 positioned below the coils and a pressure exerting compression spring member 115 held below a cover member 116 and the top portion of the primary and secondary coil means. A threaded member 117 is shown positioned through the wall portion 110 and connected with a rod member 118 that in turn connects with the lower wedge support member 114. Thus, clockwise or counterclockwise adjustments of screw member 117 will serve to move inwardly and outwardly the wedge member 114 so as to correspondingly effect the raising or lowering of the upper wedge member 113 and the coil means 97 and 98. Such attachment means is of particular value in providing for the calibration or initial adjustment of the device so that the LVDT can be set to a null point, or a no change point, whereby there can be subsequent continuous readings of a rate of ascent or of a rate of descent responsive to the nature of the voltage readings.

It should of course be noted that the same principle of operation is utilized for the embodiment of FIGURE 5 as that set forth in connection with FIGURE 1, with the only major difference being the utilization of a movable diaphragm 73 in lieu of the expansible and compressible capsule member 3. At the same time, the diaphragm 73 together with the extended tubular passageway means from the bleed passageway 90 permits an elimination of fixed partitioning means within the housing so as to effect a separation of the altitude sensing and rate sensing zones. The embodiment of FIGURE 5 also shows that there may be variations in the method of supporting and adjusting the LVDT unit within the device. Still other mechanical modifications or construction arrangements can of course be made within the scope of the present invention. For example, the capsule 77 could be replaced by a suitable diaphragm that would extend across an enclosed lower portion of the housing such that there is an enclosed and evacuated section providing an equivalent to the interior of capsule 77 and resulting diaphragm movement responsive to changes in altitude from chamber 74.

We claim as our invention:

1. A rate of change in altitude indicating apparatus, which comprises, in combination, a housing having a static air pressure inlet means, an internal altitude sensing chamber directly open to said inlet means, altitude sensing means located within said altitude sensing chamber and providing movement therefrom responsive to different altitudes, a separate internal pressure tight rate sensing chamber located within said housing, rate sensing means located within said rate sensing chamber, static pressure communication means from said static air pressure inlet means to the rate sensing means, bleed passageway means provided between said altitude sensing chamber and said rate sensing chamber, adjustable flow proportioning orifice means incorporated in said bleed passageway means, said adjustable flow proportioning orifice means being linked to said altitude sensing means and responding to expansion and contraction responses of the altitude sensing means to different altitudes in a manner providing a non-linear change in orifice area and a non-linear static pressure flow rate through said bleed passageway to said rate sensing chamber responsive to different altitudes, causing movement in the rate sensing means responsive to different altitudes, and indicator means connective with and operating responsive to the movement of said rate sensing means, whereby both rates of ascent and of descent are indicated.

2. The apparatus of claim 1 further characterized in that said indicator means connective with said rate sensing means comprises a linearly variable differential transformer having a movable core, said movable core being linked to the rate sensing means, and adjusted to provide a voltage change in either direction from a null point corresponding to a zero rate of change of pressure of the rate sensing means, whereby a direct analog readout of both a rate of climb and a rate of descent is obtained.

3. The apparatus of claim 2 still further characterized in that the voltage output from said linearly variable differential transformer is connective with a demodulating circuit to provide a desired controlled low voltage range.

4. The apparatus of claim 1 further characterized in that said indicator means comprises a direct make and break switching circuit for a predetermined rate of change of altitude with respect to rate of climb and to rate of descent.

5. The apparatus of claim 1 further characterized in that said adjustable orifice means in said bleed passageway means comprises movable valving means in turn providing non-linear flow from such passageway responsive to a particular altitude level from said altitude sensing capsule.

6. The apparatus of claim 5 still further characterized in that said movable valving means is designed to provide varying areas through the orifice means in a non-linear manner following changes in static pressure for a predetermined increment of altitude change from a full open position to a small open area at a predetermined high altitude.

7. The apparatus of claim 1 further characterized in that the altitude sensing means is an enclosed capsule which has been evacuated to thus provide outward expansive movements from at least one face thereof responsive to lower static pressures from increased altitudes.

8. The apparatus of claim 1 further characterized in that said rate sensing means is a capsule housed in said rate sensing chamber and the interior of the chamber is connective with said static air pressure inlet means, whereby the exterior of such capsule receives a non-linear proportioned pressure effect thereon from the orifice means.

9. The apparatus of claim 1 further characterized in that said rate sensing means is a movable diaphragm member providing partitioning between said altitude sensing chamber and the rate sensing chamber whereby such diaphragm receives on one face a static air pressure effect from the altitude sensing chamber side and a non-linear proportioned pressure effect on the other face from said rate sensing chamber.

10. The apparatus of claim 9 still further characterized in that said rate sensing diaphragm member connects through a centrally attached rod means to a movable core member of a linearly variable differential transformer and that the rod means from the central portion of said diaphragm is connected to flexible plate guide means whereby there is a substantially frictionless guiding and support of the core member to operate responsive to the movement of the rate sensing diaphragm.

References Cited

UNITED STATES PATENTS 3,282,111  11/1966  Andresen _____ 73—410
3,321,968  5/1967  Joline _____ 73—179

S. CLEMENT SWISHER, *Primary Examiner.*

J. W. NOLTON, *Assistant Examiner.*